INVENTOR
Klaus Friesecke

By ATTORNEYS

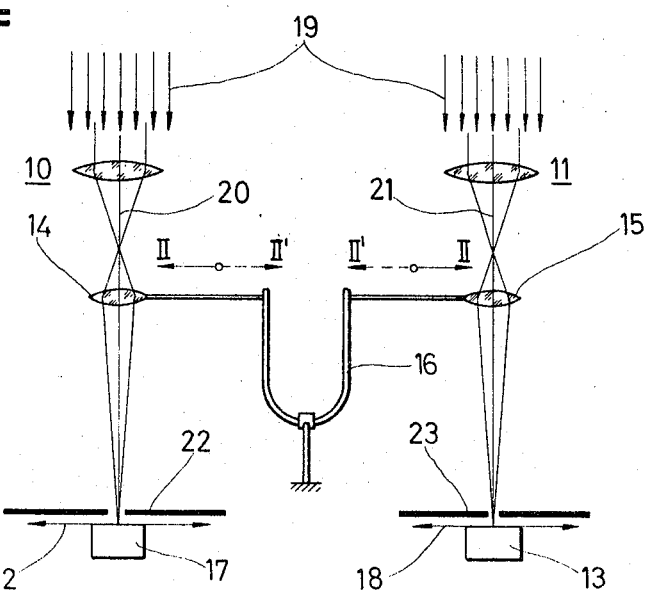
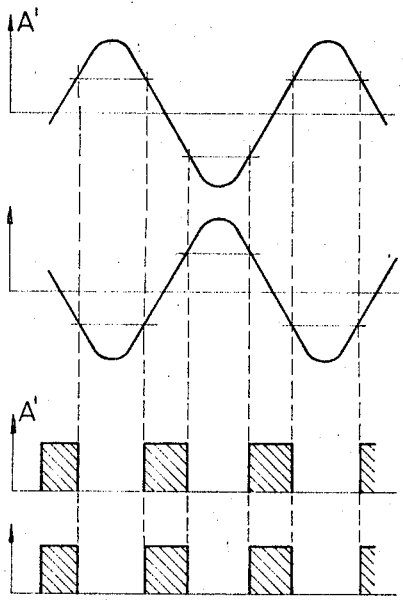
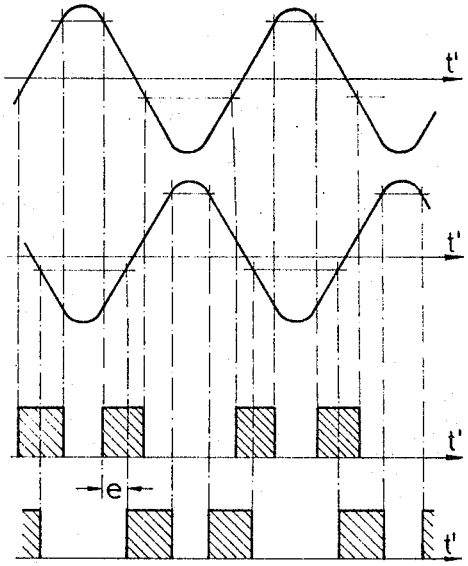
INVENTOR
Klaus Friesecke

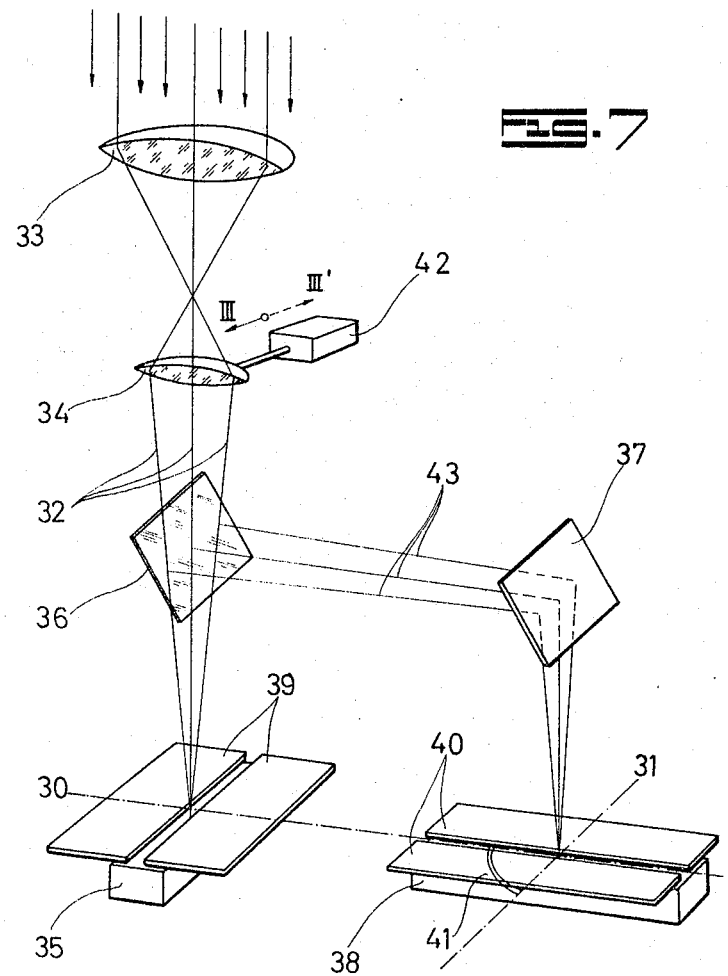

United States Patent Office 3,448,284
Patented June 3, 1969

3,448,284
LIGHT BEAM DIRECTION DETECTOR WITH RECIPROCATING LENS
Klaus Friesecke, Munich, Germany, assignor to Bolkow Gesellschaft mit beshrankter Haftung, Ottobrunn, near Munich, Germany
Filed June 28, 1966, Ser. No. 561,191
Int. Cl. H01j 3/14
U.S. Cl. 250—234                    10 Claims

ABSTRACT OF THE DISCLOSURE

An instrument for measuring the deviation of the direction of a radiation source, such as the sun, from a predetermined reference direction includes a device for converting a variable angular value into electric pulses having variable time intervals. The device includes a photoelectric converter, a multiple lens optical system for producing an image of the source at infinity on the converter, oscillator means reciprocating a lens cyclically transversely of the optical axis of the system with reciprocations of substantially constant amplitude, and slit stop means stationarily interposed between the reciprocated lens and the converter and extending transversely of the direction of lens reciprocation. When the optical axis coincides with the direction of the source, the output pulses of the converter are spaced at equal time intervals and, when the optical axis deviates from the direction of the source, the output pulses have unequal time intervals.

Background of the invention

This invention relates to instruments for measuring the deviation of the direction of the sun from a predetermined reference and, more particularly, to a novel electric-optical device for converting a variable angular value into electric pulses with time intervals variable in accordance with the deviation of the direction of the sun from such predetermined reference direction.

Measuring instruments of the type to which the improvement of the present invention is directed are required to measure the deviations of the direction of the sun from a reference direction with an accuracy of 10 angle seconds, such as is required in control devices for space missiles or artificial satellites. Due to the eccentricity of the orbit of the earth, the sun appears, in the vicinity of the earth, at an angle that varies by ±0.5 angle minutes in the course of one year. It is therefore necessary to relate the measurement to the center of the sun, and difficulty has been experienced in providing a device which would be simple and reliable under outer space conditions corresponding to its intended environment.

An object of the present invention is to provide an improved and simplified device for converting a variable angular value into electrical impulses with variable time intervals.

Another object of the invention is to provide such a device including a multiple lens optical system operable to produce an image of the sun on a photoelectric converter, oscillator means operable to reciprocate a lens of the system transversely of the optical axis thereof through a substantially constant amplitude of reciprocation and slit stop means interposed between the reciprocated lens and the photoelectric converter and extending transversely of the direction of lens oscillation.

A further object of the invention is to provide such a device in which the moving lens is very small and light so that the energy required for reciprocation thereof is kept within a narrow limit.

Yet another object of the invention is to provide such a device in duplicate, or as a dual device, with the two moving lenses being driven in phase opposition and transversely of the parallel optical axes of the two optical systems.

A further object of the invention is to provide such a dual device in which both lenses are reciprocated by a single oscillator means.

Still another object of the invention is to provide a device of the type just mentioned in which the two photoelectric converter provide pulse sequences whose pulses are mutually phase displaced.

With the arrangement in which a pair of lenses are reciprocated in phase opposition, it is possible to obtain a greater time difference between the electrical signals, as compared to the simple arrangement including only one optical system having a lens reciprocated through a constant amplitude. Furthermore, the evaluation of the pulse sequences with known electrical instruments, not comprised within the scope of the invention, is simplified due to there being two separate pulse sequences supplied thereto.

Still another object of the invention is to provide two such devices, which are identical, and which are so arranged that their measuring axes are at an angle to each other whereby there may be obtained pulse sequences from whose time intervals there can be derived signals proportional to the angles by which the optical axes of the two devices have migrated from a position coincident with the direction of the sun.

A further object of the invention is to provide, in a dual device of the type just mentioned, light deflecting means positioned in the path of light rays along the optical axis of an optical system and between the reciprocated lens and the slit stop means, the light deflecting means producing a second image of the sun in an additional photoelectric converter.

A further object of the invention is to provide a device of the type just mentioned in which the respective slit stop means associated with the two photoelectric converters have respective measuring axes which extend at an angle to each other.

Another object of the invention is to provide a device of the type just mentioned in which the driven lens is reciprocated in a direction parallel to the bisector of the angle between the direction of the two slit stop means.

For an understanding of the principles of the invention, reference is made to the following description of typical embodiments thereof as illustrated in the accompanying drawings.

In the drawings:

FIG. 4 is a schematic illustration of another embodiment of the device of the invention in which there are two optical systems having parallel optical axes and with the two lenses being reciprocated in phase opposition;

Figure 2:
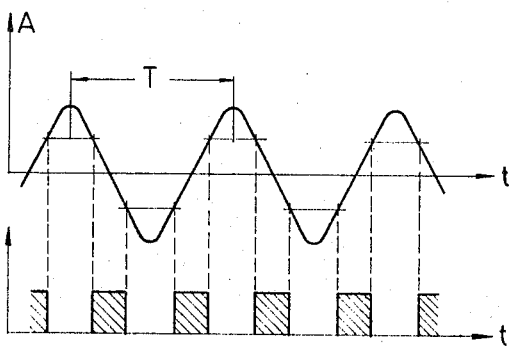
FIG. 2 is a graphical illustration of the lens movement and the pulses produced in the photoelectric converter, plotted as a function of time, and with the direction of the sun coincident with the predetermined reference direction.
Figure 3:
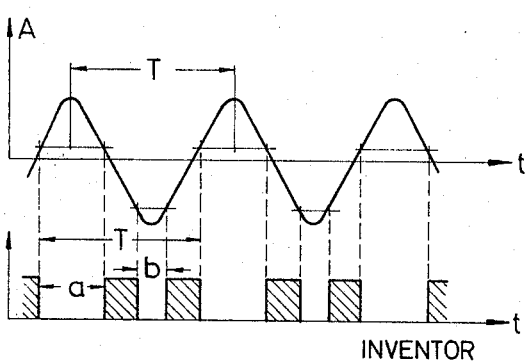
FIG. 3 is a graphical illustration similar to FIG. 2, but illustrating the case when the optical axis and the incident light direction are at an angle to each other.

FIGS. 5 and 6 are graphical illustrations, corresponding respectively to FIGS. 2 and 3, but related to the embodiment of the invention shown in FIG. 4; and FIG. 7 is a schematic oblique parallel projection of a further embodiment of the invention in which light deflecting means are arranged in the light ray path of the optical system, and including two converter systems having their measuring axes at an angle to each other, the moving lens being oscillated parallel to the bisector of the angle.

Figure 1:
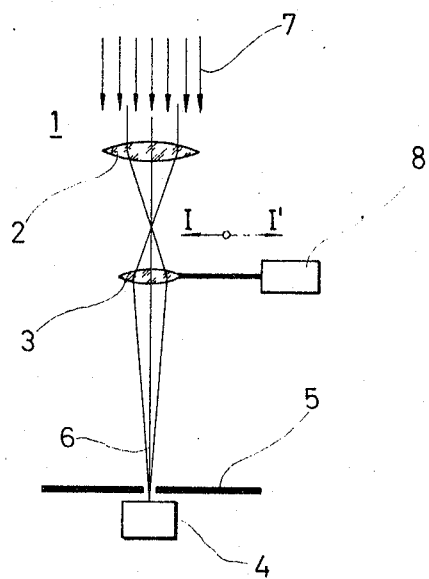
FIG. 1 is a somewhat schematic illustration of one form of device for converting a variable angular value into electric pulses having variable time intervals, in accordance with the invention.

Referring to FIG. 1, a device 1 for converting a variable angular value into electric pulses having variable time intervals is illustrated, the device 1 being arranged for incorporation in an instrument for measuring the deviation of the direction of the sun from a predetermined reference direction. Device 1 includes a projection system including lenses 2 and 3 and a photoelectric converter 4. The projection system is arranged to provide an image (not illustrated) of the sun at infinity at the photoelectric converter 4. Converter 4 is partly covered by a slit stop 5 extending perpendicularly to the plane of the drawing.

In the illustrated embodiment of the invention, the optical axis 6 of the device extends parallel to the incident light 7, that is, the device is oriented exactly with respect to the sun. An oscillator 8 is connected to lens 3 and reciprocates lens 3 transversely of optical axis 6, the reciprocations having an amplitude A and a time period T transversely of optical axis 6 and also of slit stop 5. The reciprocation is in the direction of the arrows I–I'.

In FIG. 2, the amplitude A is plotted along the y-axis and the time t is plotted along the x-axis. In the case illustrated in FIG. 2, the image of the sun is directed through the slit stop 5 so that voltage pulses are formed in photoelectric converter 4, and these pulses have time intervals which are equal for the positive and negative half waves of the reciprocations, as is illustrated in the lower half of FIG. 2.

When the optical axis 6 extends at an angle to the direction of the incident light 7, the reversal points of the movements of the image are displaced transversely to the optical axis to the right or left. This state is illustrated graphically in FIG. 3. The difference between the time intervals a and b of the voltage pulses formed in photoelectric converter 4, in this case, is proportional to the deviation angle which is the angle formed between optical axis 6 and incident light 7. The means for deriving the difference between the time intervals a and b is not part of the invention, and this derivation can be effected with known means. For example, it may be effected by means of flip-flop circuits which are switched by photoelectric converter 4 and which supply rectangular pulses of the durations a and b from which the difference proportional to the angle of deviation can be derived.

In the embodiment of the invention shown in FIG. 4, two devices identical to the device 1 are illustrated at 10 and 11. Devices 10 and 11 are arranged so that their measuring axes 12 and 13, respectively, are either rectilinearly aligned or are parallel to each other. The respective moving lenses 14 and 15 of the devices are driven by a single oscillator 16, which is represented, in a simplified manner, as a tuning fork. The lenses 14 and 15 are reciprocated in the directions indicated by the arrows II–II' in phase opposition and transversely of slit stops 22 and 23 positioned above phtoelectric converters 17 and 18.

When the device of FIG. 4 is oriented exactly relative to the sun, and the lenses 14 and 15 are reciprocated in phase opposition, as illustrated in the upper half of the graphical illustration of FIG. 5, voltage pulses having equal time intervals are formed in the two photoelectric converters 17 and 18 as shown in the lower half of FIG. 5. In correspondence with FIGS. 2 and 3, the coordinates in FIG. 5 are designated A' and t'.

FIG. 6 corresponds to FIG. 3 and illustrates the operation of the device of FIG. 4 when the direction of incident light 19 forms an angle with the optical axes 20 and 21. In this case, photoelectric converters 17 and 18 yield two pulse sequences as represented in the lower half of FIG. 6. The individual pulses of the two pulse sequences have a phase displacement e corresponding to the deviation angle. Since there are two separate pulse sequences, and the time difference of two successive pulses increases and is greater than with equal deviation angles, the evaluation of the pulses is substantially simplified and is more accurate than is possible with the arrangement shown in FIG. 1.

If two of the described devices are combined in such a manner that their measuring axes form an angle with each other, such an arrangement supplies pulse sequences from whose pulse time intervals there can be obtained signals proportional to the two angles by which their respective optical axes have deviated from their zero position transversely to the incident light. An arrangement of this type is shown in FIG. 7.

Referring to FIG. 7, one projection lens and its associated oscillator have been eliminated, as compared to the arrangement shown in FIG. 4. In FIG. 7, the path of the light rays is indicated at 32 and the projection system is illustrated as comprising a stationary lens 33 and a reciprocated lens 34 producing an image of the sun at infinity on a photoelectric converter 35. A semi-transparent mirror 36 is arranged between lens 34 and photoelectric converter 35 and diverts a part of the light rays, as indicated at 43, to a mirror 37. The deflected light rays 43, as reflected by mirror 37, produce a second image of the sun at infinity on a second photoelectric converter 38. Slit stops 39 and 40 are associated with the respective photoelectric converters 35 and 38 in such a manner that the measuring axes 30 and 31 of the slit stops form an angle 41 with each other. Moving lens 34 of the optical system is driven by oscillator 42 with its direction of reciprocation III–III' extending parallel to the bisector of angle 41.

While specific embodiments of the invention have been shown and described in detail to illustrate the application of the principles of the invention, it will be understood that the invention may be embodied otherwise without departing from such principles.

What is claimed is:

1. In an instrument for measuring the deviation of the direction of a radiation source, such as the sun, from a predetermined reference direction, a device for converting a variable angular value into electric pulses having variable time intervals, said device comprising, in combination, photoelectric converter; a multiple lens optical system having an optical axis and operable to produce an image of the source at infinity on said photoelectric converter; oscillator means connected to a lens of said system and operable to reciprocate said lens cyclically transversely of said optical axis with reciprocations of substantially constant amplitude; and slit stop means stationarily interposed between said lens and said photoelectric converter and extending transversely of the direction of lens reciprocation; whereby when said optical axis coincides with the direction of the source, output pulses produced in said photoelectric converter, responsive to reciprocation of said lens tranversely of said slit, are spaced at equal time intervals and, when said optical axis forms an angle with the direction of the source, the output pulses produced by said photoelectric converter have unequal time intervals.

2. A device, as claimed in claim 1, including two photoelectric converters; two multiple lens optical systems each having an optical axis and each associated with a respective photoelectric converter, the two optical axes extending parallel to each other; oscillator means operable to reciprocate one lens of each optical system; and respective slit stop means interposed between the movable lens of each system and the associated photoelectric converter.

3. A device, as claimed in claim 2, in which said oscillator means reciprocates the lenses of two systems in phase opposition.

4. A device, as claimed in claim 3, in which said oscillator means comprises a single oscillator connected to both movable lenses.

5. A device, as claimed in claim 2, in which the two measuring axes, each extending transversely of a respective slit stop means, intersecting each other at an angle.

6. A device, as claimed in claim 2, in which the measuring axes, each extending transversely of a respective slit stop means, are parallel with each other.

7. A device, as claimed in claim 1, including a second photoelectric converter; second slit stop means interposed between said lens and said second photoelectric converter and extending transversely of the direction of lens oscillation; and light deflecting means interposed between said lens and said second slit stop means and effective to produce a second image of the source on said second photoelectric converter.

8. A device, as claimed in claim 7, in which said light deflecting means comprises a semi-transparent mirror interposed between said lens and said first slit stop means, and a second mirror interposed between said semi-transparent mirror and said second slit stop means, said semi-transparent mirror deflecting a portion of the light rays passing through said lens to said second mirror for reflection through said second slit stop means.

9. A device, as claimed in claim 7, in which the measuring axes of said two slit stop means extend at an angle to each other.

10. A device, as claimed in claim 9, in which the direction of reciprocation of said lens is parallel to the bisector of the angle formed between said two slit stop means.

References Cited

UNITED STATES PATENTS

| 3,239,674 | 3/1966 | Aroyan | 250—203 |
| 3,254,227 | 5/1966 | Hock | 88—14 |

RALPH G. NILSON, *Primary Examiner.*

MORTON ABRAMSON, *Assistant Examiner.*

U.S. Cl. X.R.

88—14; 250—235